June 12, 1951  H. F. CLAUSEN  2,556,416
ROD WEEDER
Filed Oct. 22, 1945  3 Sheets-Sheet 1
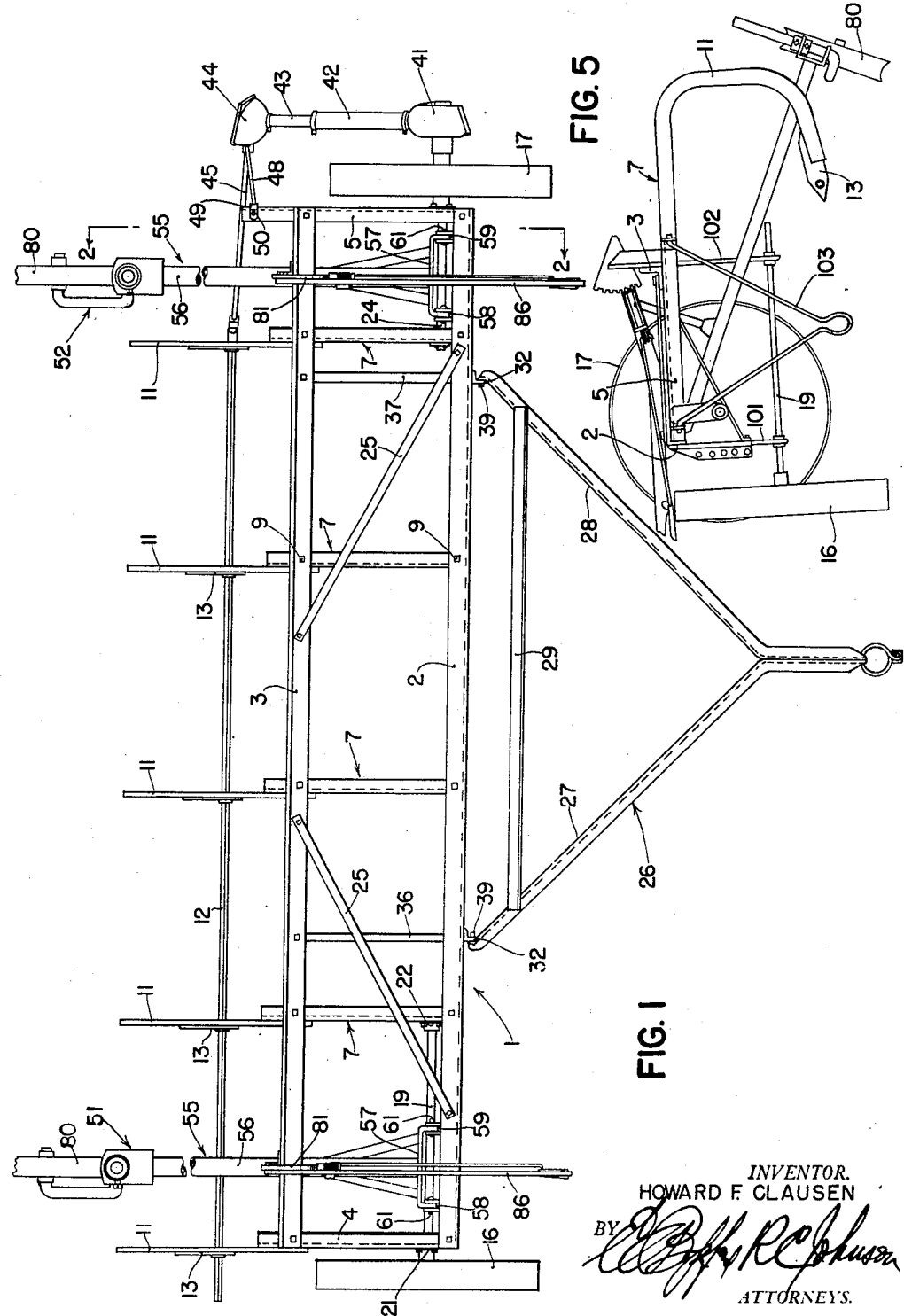
INVENTOR.
HOWARD F. CLAUSEN
BY 
ATTORNEYS.

June 12, 1951  H. F. CLAUSEN  2,556,416
ROD WEEDER
Filed Oct. 22, 1945  3 Sheets-Sheet 2
FIG. 4
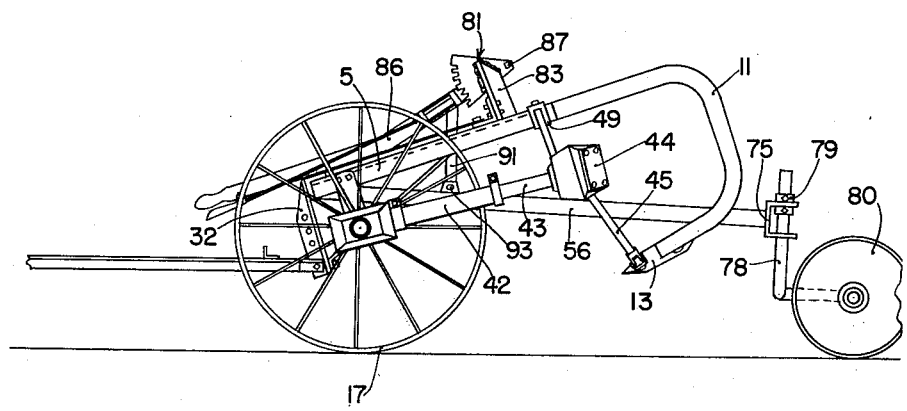
FIG. 2
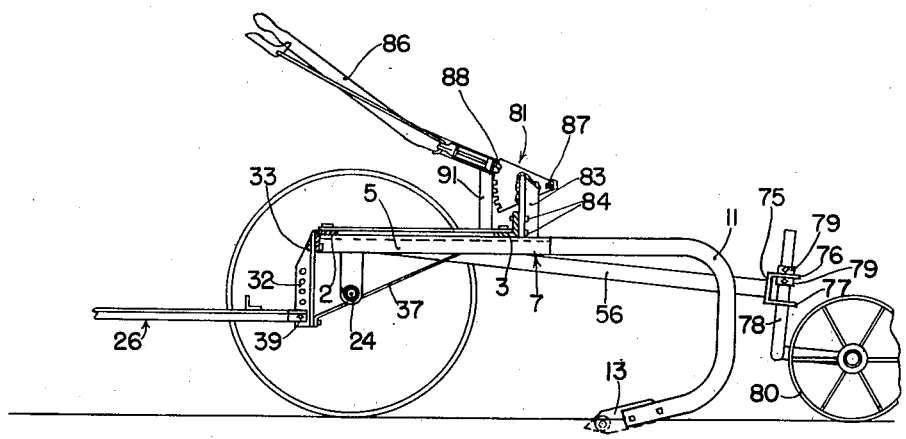
INVENTOR.
HOWARD F. CLAUSEN
ATTORNEYS.

June 12, 1951     H. F. CLAUSEN     2,556,416
ROD WEEDER
Filed Oct. 22, 1945     3 Sheets-Sheet 3
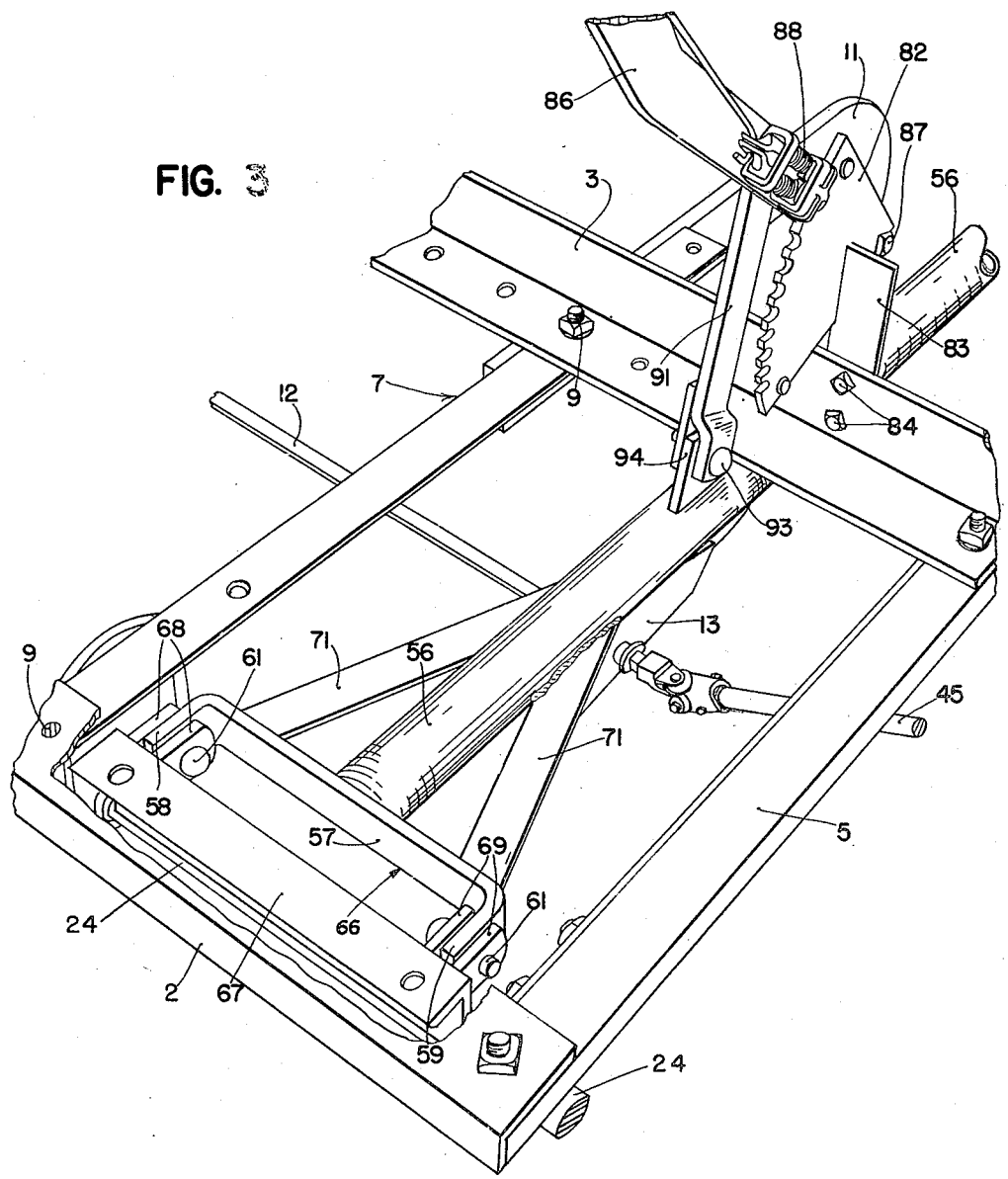
FIG. 3
INVENTOR.
HOWARD F. CLAUSEN
ATTORNEYS.

Patented June 12, 1951

2,556,416

UNITED STATES PATENT OFFICE 2,556,416

ROD WEEDER

Howard F. Clausen, Moline, Ill., assignor to Deere & Company, Moline, Ill., a corporation of Illinois Application October 22, 1945, Serial No. 623,640

4 Claims. (Cl. 97—42)

The present invention relates generally to agricultural implements and more particularly to rod weeders.

The object and general nature of the present invention is the provision of a new and improved rod weeder in which easily and conveniently operated means is provided for adjusting the operating depth of the weeder rod. More particularly, it is an important feature of the present invention to provide a new and improved gauge wheel mounting which provides individual control for each side of the implement and, additionally, provides for raising the tool into a relatively high transport position so that there is adequate clearance below the weeder rod and shoes when moving the implement from one field to the other or along lanes, highways and the like. Another important feature of this invention is the provision of new and improved castering gauge wheel structure which is particularly constructed and arranged to swing generally vertically so as to accommodate raising and lowering the weeder rod and, additionally, has sufficient strength and rigidity to accommodate the transverse or endwise movement of the implement during transport, the castering wheels merely swinging around into a transverse position to accommodate said transverse movement.

These and other objects and advantages of the present invention will be apparent to those skilled in the art after a consideration of the following detailed description, taken in conjunction with the accompanying drawings in which:

Figure 1 is a plan view of a rod weeder in which the principles of the present invention have been incorporated.

Figure 2 is a sectional view taken generally along the line 2—2 of Figure 1.

Figure 3 is an enlarged fragmentary perspective view showing the swingable connection between each of the caster wheel frame bars and the front angle of the main frame.

Figure 4 is a view similar to Figure 1, but with the parts arranged for transport.

Figure 5 is an end view of the rod weeder arranged for endwise transport.

Referring now more particularly to Figures 1 and 2, the frame of the rod weeder is indicated by the reference numeral 1 and comprises a front transverse frame bar in the form of an angle 2 and a rear transverse frame member in the form of an angle 3, both extending transversely of the implement and connected together at their ends by right and left end bars 4 and 5. Preferably, each of the end bars is made up of a pair of angles welded together along their contacting edges to form a box beam, and each end bar is extended rearwardly a short distance back of the rear frame angle 3. Also forming a part of the frame is a plurality of pendant beams 7, each of which is bolted to both the front and rear frame angles 2 and 3, as indicated at 9, and each beam at its rear end is formed with a downwardly and forwardly extending pendant section 11 in which a weeder rod 12 is journaled for rotation, as by means of conventional weeder rod bearing shoe units 13. A plurality of holes is formed in the frame angles 2 and 3 so as to provide for attaching the beams 7 in different positions.

End wheels 16 and 17 are provided, the latter wheel being provided with lugs, if necessary, so as to provide ground contacting means for driving the rod 12. The right end wheel 16 is shown as mounted on an axle 19 that is carried in a pair of brackets 21 and 22, the latter bracket being fixed to the adjacent beam 7 while the bracket 21 is bolted to the end bar 4. Similar brackets attach the left hand axle 24 to the left end of the frame 1. The frame is braced by one or more diagonal rods 25, and a hitch frame 26, including suitably formed angles 27 and 28 arranged in diverging relation at their rear ends and connected by a transverse cross bar 29, is pivotally connected to the frame 1. To this end, a pair of vertical angle brackets 32 is bolted, as at 33, to the front flange of the angle 2 and each bracket 32 extends downwardly therefrom, the forwardly extending flange of each being apertured at a number of points to provide for pivotally connecting the hitch frame 26 at any one of a number of points. The lower end of each bracket 32 is reenforced by a pair of brace members 36 and 37 extending, respectively, to the rear frame angle 3 and the front frame angle 2 laterally outwardly of the associated bracket 32. The hitch frame 26 is pivotally connected to the hitch brackets 32 by bolts 39 or other suitable means inserted in selected openings in the hitch angle flanges.

The weeder rod 12 is driven by a connection with the ground wheel 17, said connection including bevel gearing constructed generally along the lines of the co-pending application Serial No. 566,297, filed December 2, 1944 by Virgil F. Bozeman and Howard F. Clausen, now Patent No. 2,488,265, issued November 15, 1949, to which reference may be made if necessary. Briefly, the driving connection includes a stub shaft connected to the wheel 17 and extending outwardly into a gear case 41 into which a longitudinal shaft extends, the two shafts being connected together by a pair of bevel gears. The longitudinally extending shaft is enclosed in a pair of telescopic sleeves 42 and 43, the latter being connected at its rear end to a rear gear case 44 in which a second pair of bevel gears is disposed, one being mounted on the rear end of the aforesaid longitudinal shaft and the other being fixed to the laterally outer end of a shaft 45 which at its lower and inner end is connected with the weeder rod 12. The rear case 44 and associated parts are supported by a gear case hanger bracket 48 having a yoke 49 at its upper end embracing the rear end of the frame end member 5 and securely bolted thereto, as at 50.

The position of the weeder rod is controlled by a pair of separately adjustable gauge wheel units 51 and 52, each unit preferably being identical so that a detailed description of one will suffice for both. Each gauge wheel unit comprises a generally longitudinally disposed gauge wheel frame 55 which preferably comprises a longitudinally disposed pipe member 56 welded at its forward end to a U-shaped part 57 the ends 58 and 59 of which are apertured to receive pins 61 which pivotally connect the gauge wheel frame to a hinge angle assembly 66. The latter is made up of an angle 67 and two pairs of apertured lugs 68, 69 welded thereto. The lugs 68 and 69 are apertured so as to receive the pins 61 with the ends 58 and 59 of the attaching U-shaped member 57 therebetween. The member 57 is reenforced by a pair of diagonally extending straps 71 which are welded to the pipe 56 and to the U-shaped part 57 adjacent the ends thereof.

A gauge wheel standard guide 75 is secured, as by welding, to the rear end of each pipe member 56 and has lug portions 76 and 77 apertured to receive the upper portion of the gauge wheel standard 78. A pair of collars 79 are disposed on the upper end of the standard 78 on opposite sides of one of the guide lugs 76, and disposing the collars 79 in different positions on the standard 78 provides for adjusting the position of the latter relative to the rear end of the associated gauge wheel frame member. The lower end of the standard 78 is formed to receive a castering gauge wheel 80.

A sector and bracket unit 81, comprising a notched sector 82 and an angle bracket 83 to which the sector 82 is welded, is bolted at 84 to the vertical flange of the rear frame angle 3. A hand lever 86 is pivoted at 87 to the sector 82 and carries detent mechanism 88 which cooperates with the sector 82 to lock the adjusting lever 86 in position. A link 91 is pivoted at its upper end to the lever 86 and at its lower end receives a pin 93 which extends through an aperture in a lug 94 that is welded to the gauge wheel frame pipe 56. Each of the gauge wheel frames 55, it will be noted, is connected to the front frame angle 2 and extends rearwardly above the associated axle, 19 or 24, and extends rearwardly below the rear frame angle 3, the lug 94 being disposed adjacent the front portion of the frame pipe 56, whereby a relatively small amount of movement of the adjusting hand lever serves to swing the gauge wheel frame through a relatively large angle relative to the main frame. As a result of this construction, the weeder rod may be raised to a relatively high position out of contact with the ground with one movement of the hand levers.

When it is desired to raise the machine into a transport position, both hand levers 86 are swung downwardly into a position close to the frame 1, thus lowering both gauge wheels relative to the main frame and raising the weeder rod into a relatively high position. The implement may be transported in this position, provided there are no relatively narrow lanes or gates through which it is desired to drive the apparatus. In that case it is necessary to arrange the implement for endwise transport, and according to the principles of the present invention this is done, as best shown in Figure 5, by removing the hitch frame unit 26, taking off the axle 19 and wheel 16 and mounting the same at the front side of the frame, the front and rear angles being apertured to provide for the attachment of brackets 101 and 102 to receive the shaft 19, with the wheel 16 disposed alongside the frame angle 2. An auxiliary hitch frame 103 is then connected to the end of the frame and hitched to a tractor or other source of power. The caster wheels 80 require no adjustment since, when the implement is drawn endwise, the caster wheels swing around into a new trailing position. The brackets 101 and 102 which mount the axle 19 in its transport position are of sufficient length to dispose the frame high enough so that the other ground wheel 17 is lifted free of the ground.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. A rod weeder comprising a main frame having end wheels, a weeder rod, means for driving said weeder rod from one of said wheels, a pair of independently movable gauge wheel frames, each pivotally connected to the front portion of the main frame and extending generally rearwardly of the rear portion thereof, whereby the main frame may be raised and lowered relative to said gauge wheel frames, gauge wheels carried at the rear ends of said gauge wheel frames and connected therewith so as to caster, a pair of independently movable levers pivoted to the main frame and connected, respectively, to said gauge wheel frames, and means for connecting the other of said wheels to the front side of said main frame so as to arrange the machine for endwise transport, said last named means including elongated brackets having a length sufficient to dispose said other wheel in a position to raise said first ground wheel out of contact with the ground and to bring said other wheel into a position corresponding to the position of said gauge wheels when the main frame is in its highest position relative to the gauge wheel frames.

2. In a rod weeder including a main frame having a pair of end wheels, a weeder rod, and means for driving said weeder rod from one of said end wheels, the combination of a pair of generally vertically swingable gauge wheel frames pivotally connected to the main frame and extending generally rearwardly of the rear portion thereof, gauge wheels carried at the rear ends of said gauge wheel frames and connected therewith so as to caster, means for raising and lowering said main frame relative to said gauge wheel frames, and means for connecting the other of said end wheels to the front side of said main frame so as to arrange the machine for endwise transport, said last named means including elongated brackets having a length sufficient to dispose said other end wheel in a position to raise said first end wheel out of contact with the ground and to bring said other end wheel into a position corresponding to the position of said gauge wheels when the main frame is in its highest position relative to the gauge wheel frames.

3. In a rod weeder including a main frame having a pair of end wheels, a weeder rod, and means for driving said weeder rod from one of said end wheels, the combination of a pair of castering gauge wheels disposed at the rear side of said main frame, means for raising and lowering that side of the main frame relative to said gauge wheels, and means for connecting the other of said end wheels to the front side of said main frame so as to arrange the machine for endwise transport, said last named means including elongated brackets having a length sufficient to dispose said other end wheel in a position to raise said first end wheel out of contact with the ground and to bring said other end wheel into a position corresponding to the position of said gauge wheels when the main frame is in its highest position relative to the gauge wheels.

4. For use in a rod weeder including a main frame having a pair of end wheels, a weeder rod, and means for carrying the weeder rod on said main frame, the improvement comprising a pair of generally vertically swingable gauge wheel frames adapted to be pivotally connected to the main frame and extending generally rearwardly of the rear portion thereof, gauge wheels carried by said gauge wheel frames and connected therewith so as to caster, means for raising and lowering said main frame relative to said gauge wheel frames, and means for connecting one of said end wheels to the front side of said main frame so as to arrange the rod weeder for endwise transport, said last named means including elongated bracket means having a length sufficient to dispose said one end wheel in a position to raise the other end wheel out of contact with the ground and to bring said first mentioned end wheel into a position corresponding to the position of said gauge wheels when the main frame is in its highest position relative to said gauge wheel frames.

HOWARD F. CLAUSEN.

REFERENCES CITED

The following references are of record in the file of this patent:

UNITED STATES PATENTS

| Number | Name | Date |
|---|---|---|
| 1,621,993 | Mills | Mar. 22, 1927 |
| 1,872,121 | Christensen | Aug. 16, 1932 |
| 2,176,541 | Morris | Oct. 17, 1939 |
| 2,323,452 | Calkins et al. | July 6, 1943 |
| 2,355,229 | Miller | Aug. 8, 1944 |